United States Patent
Singh et al.

(10) Patent No.: US 12,041,318 B2
(45) Date of Patent: Jul. 16, 2024

(54) SYSTEM AND METHOD FOR AUTOMATIC DETECTION AND REPORTING OF GROUP WATERMARKING DATA

(71) Applicant: ARRIS Enterprises LLC, Suwanee, GA (US)

(72) Inventors: Virendra Singh, Bangalore (IN); Vinod Jatti, Bangalore (IN)

(73) Assignee: ARRIS Enterprises LLC, Horsham, PA (US)

( * ) Notice: Subject to any disclaimer, the term of this patent is extended or adjusted under 35 U.S.C. 154(b) by 0 days.

(21) Appl. No.: 17/337,934

(22) Filed: Jun. 3, 2021

(65) Prior Publication Data

US 2022/0046332 A1 Feb. 10, 2022

Related U.S. Application Data

(60) Provisional application No. 63/061,004, filed on Aug. 4, 2020.

(51) Int. Cl.
  *H04N 21/8358* (2011.01)
  *H04L 67/1097* (2022.01)

(52) U.S. Cl.
  CPC ..... *H04N 21/8358* (2013.01); *H04L 67/1097* (2013.01)

(58) Field of Classification Search
  CPC ............ H04N 21/8358; H04L 67/1097; H04L 29/08
  See application file for complete search history.

(56) References Cited

U.S. PATENT DOCUMENTS

| | | | |
|---|---|---|---|
| 2007/0033408 A1* | 2/2007 | Morten | H04L 63/1408 713/176 |
| 2014/0282858 A1* | 9/2014 | Moskowitz | H04L 63/08 726/1 |
| 2019/0356966 A1* | 11/2019 | Zuydervelt | H04N 21/4825 |
| 2020/0304821 A1* | 9/2020 | Davis | H04N 21/6581 |

* cited by examiner

*Primary Examiner* — Yassin Alata
(74) *Attorney, Agent, or Firm* — Panitch Schwarze Belisario & Nadel LLC

(57) ABSTRACT

A method, apparatus, article of manufacture, and a memory structure for managing media content having group watermarking data is disclosed. The method comprises transmitting a request to receive the media content from a content playback device, receiving a response to the transmitted request, fetching, by the content playback device according to the response, the requested media content and a watermark schema, the watermark schema fetched from cloud-based storage, identifying, by the content playback device, the group watermarking data in the media content according to the fetched watermarking schema, determining, by the content playback device if the media content is authorized for provision according to the group watermarking data and the fetched watermarking schema, and providing the media content for playback according to the determined authorization.

20 Claims, 10 Drawing Sheets

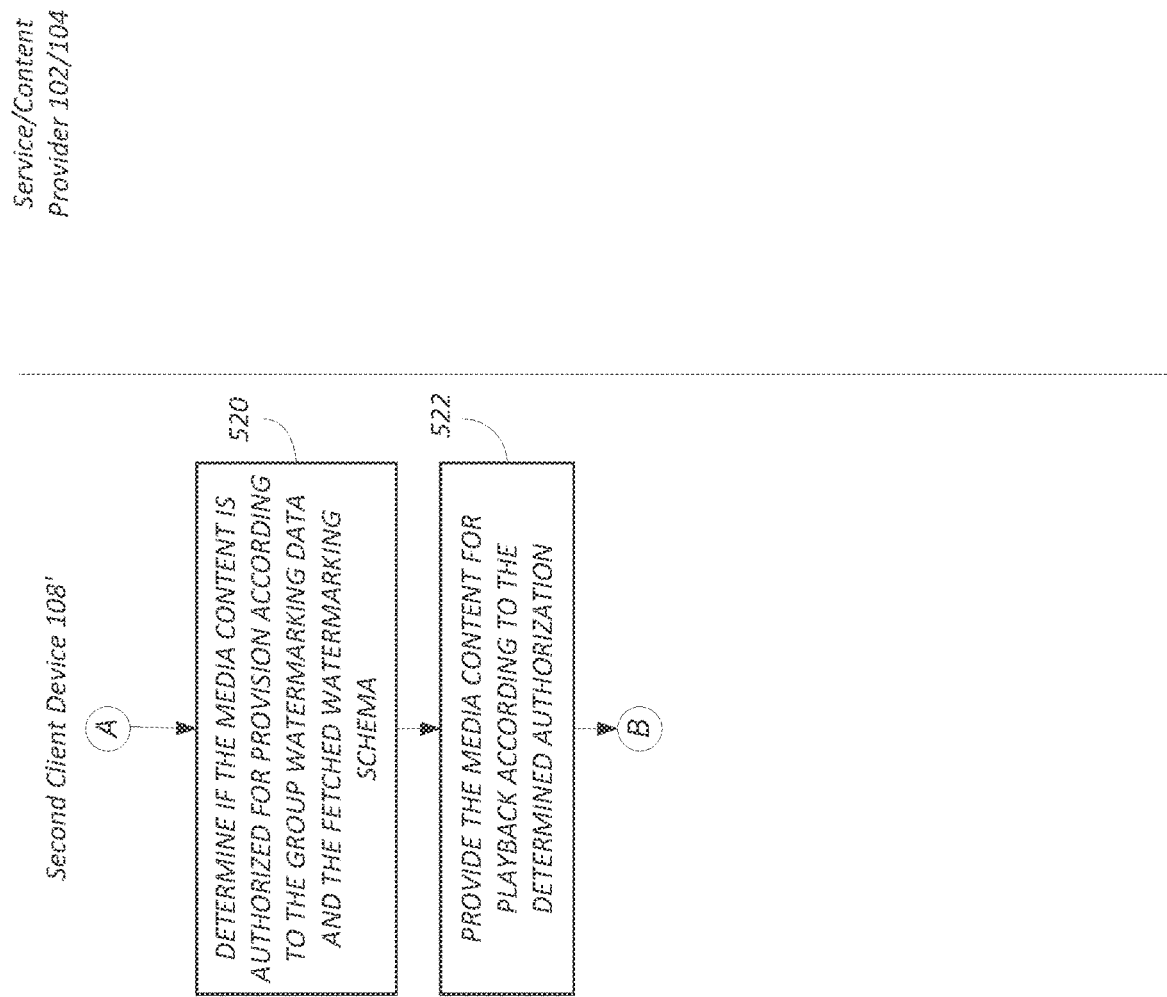

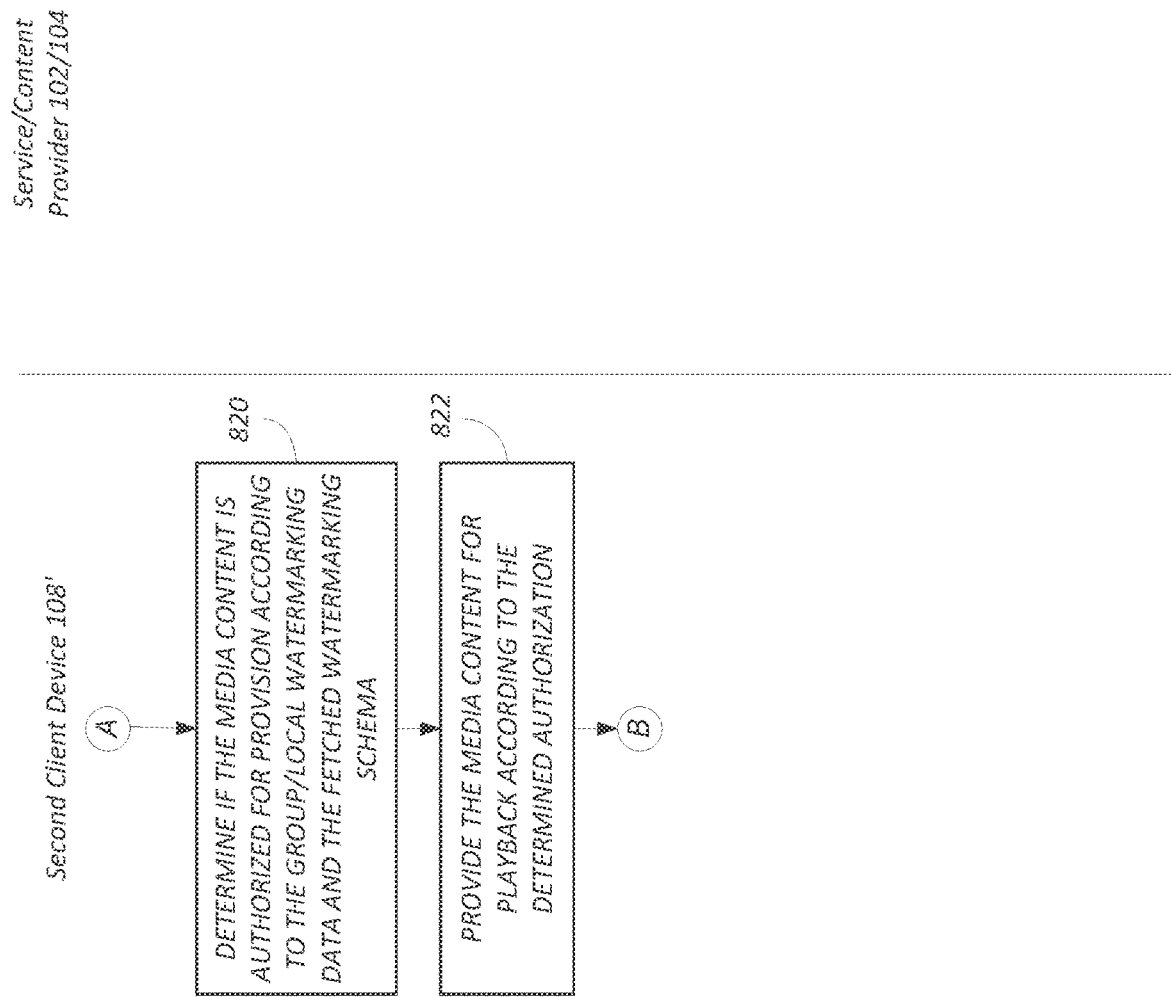

SYSTEM AND METHOD FOR AUTOMATIC DETECTION AND REPORTING OF GROUP WATERMARKING DATA

BACKGROUND OF THE INVENTION

1. Field of the Invention

The present invention relates to systems and methods for providing media programs, and in particular to a system and method for automatic detection and reporting of group watermarking data.

2. Description of the Related Art

The dissemination and playback of media programs has undergone substantial changes in the past decades. Previously, media programs (which may include audio, video, or both) were disseminated either by analog broadcast (conventional, satellite, or cable) or by dissemination of films to movie theaters. These traditional dissemination and playback means remain in use after the advent of digital technology. However, digital technologies have had a profound effect on the dissemination and playback of media programs.

Digital technology also permitted the dissemination and playback of media programs via the Internet, and with improved signal processing and more and more households with high-speed Internet access (e.g. DSL, fiber, and/or satellite). These methods of dissemination and playback have become competitive with traditional means. Dissemination of media programs via the Internet may occur either by simple downloading, progressive downloading or streaming.

"Over the Top" (OTT) dissemination of media programs refers to a process by which content providers distribute media programs in streaming media form as a standalone product directly to viewers over the Internet, bypassing telecommunications, multichannel television and broadcast television previously used to disseminate media programs. Typically, such programs are streamed over the public Internet to general processing devices (e.g. computers and smartphones), rather than a closed, private network using proprietary equipment such as set-top-boxes.

One problem with the dissemination of digital media programs is piracy. Content providers (entities that produce such content for transmission either by themselves or service providers) can face huge revenue loss due to such piracy.

One technique used to counter piracy is digital watermarking. Digital watermarking is a process by which a digital watermark is inserted into the media content. Such digital watermarks are typically embedded in the media content in a way that it does not interfere with the consumption of the media content itself (e.g. they are undetectable by the viewer). Such watermarks typically include copyright information and are typically robust against modifications. Some watermarks are inserted using steganographic techniques, where the data is embedded covertly into noisy signals or signals that vary widely. For example, a watermark can be inserted by inserting the watermarking data as the least significant bit (LSB) of video data in a particular portion of the frame.

Digital watermarks are typically used for source tracking. If a watermark is inserted at each point of distribution, and the media content is later found to have been copied and distributed in an unauthorized manner, the watermark(s) can be retrieved from the copy and the source and/or chain of distribution can be identified. However, detection is typically a manual process, and it is not a complete end to end solution. Starting from content producer to consumer, various vendors or operators play role in content supply chain, further complicating the process of tracing the source of piracy. It is also true that watermarking schemes are typically performed on an ad hoc basis, with each content or service provider using their own watermarking technique that is often incompatible with the other watermarking techniques used by other content or service providers. For example, a watermark applied by a service provider may corrupt or render ineffective a watermark inserted by the content provider that supplied the media content.

Finally, prior art digital watermarking schemes are passive protection tools, and while they can trace infringement, they do not directly prevent the unauthorized use of media content.

SUMMARY OF THE INVENTION

To address the requirements described above, the present invention discloses a method, apparatus, article of manufacture, and a memory structure for managing media content having group watermarking data. In one embodiment, the method comprises transmitting a request to receive the media content from a content playback device, receiving a response to the transmitted request, fetching, by the content playback device according to the response, the requested media content and a watermark schema, the watermark schema fetched from cloud-based storage, identifying, by the content playback device, the group watermarking data in the media content according to the fetched watermarking schema, determining, by the content playback device if the media content is authorized for provision according to the group watermarking data and the fetched watermarking schema, and providing the media content for playback according to the determined authorization.

Another embodiment is evidenced by a processor communicatively coupled to a memory storing processor instructions for performing the foregoing operations.

BRIEF DESCRIPTION OF THE DRAWINGS

Referring now to the drawings in which like reference numbers represent corresponding parts throughout:

FIGS. 5A and 5B are diagrams illustrating the application of the watermark procedure to a second client device that receives watermarked media content from the client device;

FIGS. 8A and 8B are diagrams illustrating the application of the watermark procedure to a second client device that receives locally watermarked media content from the client device.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Content producers or providers might embed watermarks in their media content before providing the content to client devices for consumption. But such client devices are typically sourced from different vendors and they do not typically share a common shared secret to be used in generating and embedding watermarks as well as recovering from the media content. The discussion below describes a common shared digital watermark (i.e. group watermark) as a shared secret among group or alliance of content producer and consumer. The group might comprise of more than one content producer and hence can be uniquely identified by subgroup identifier within the common group watermark. Also, the members of alliance group can still follow their private watermarks, so that source content is embedded with both private as well as group watermark.

In one embodiment, group watermarks are managed using a cloud-based mechanism. Content producers and client devices can secure access to the cloud-based server to fetch the watermark secrecy and rules/policy and apply those rules locally. This is used to while embedding group watermark, as well as to detect the watermark and/or notify piracy events by transmitting data to the cloud for the content providers to retrieve and process.

When a customer attempt to play video content on the client device, the client device checks for the presence of the group watermark, recovers the watermark and verifies, based at least on the recovered watermark whether the device is authorized to play content or not. During check, if the media content found to be pirated then the client device blocks or disables content playback and generates a piracy event.

Content Delivery System

Figure 1:
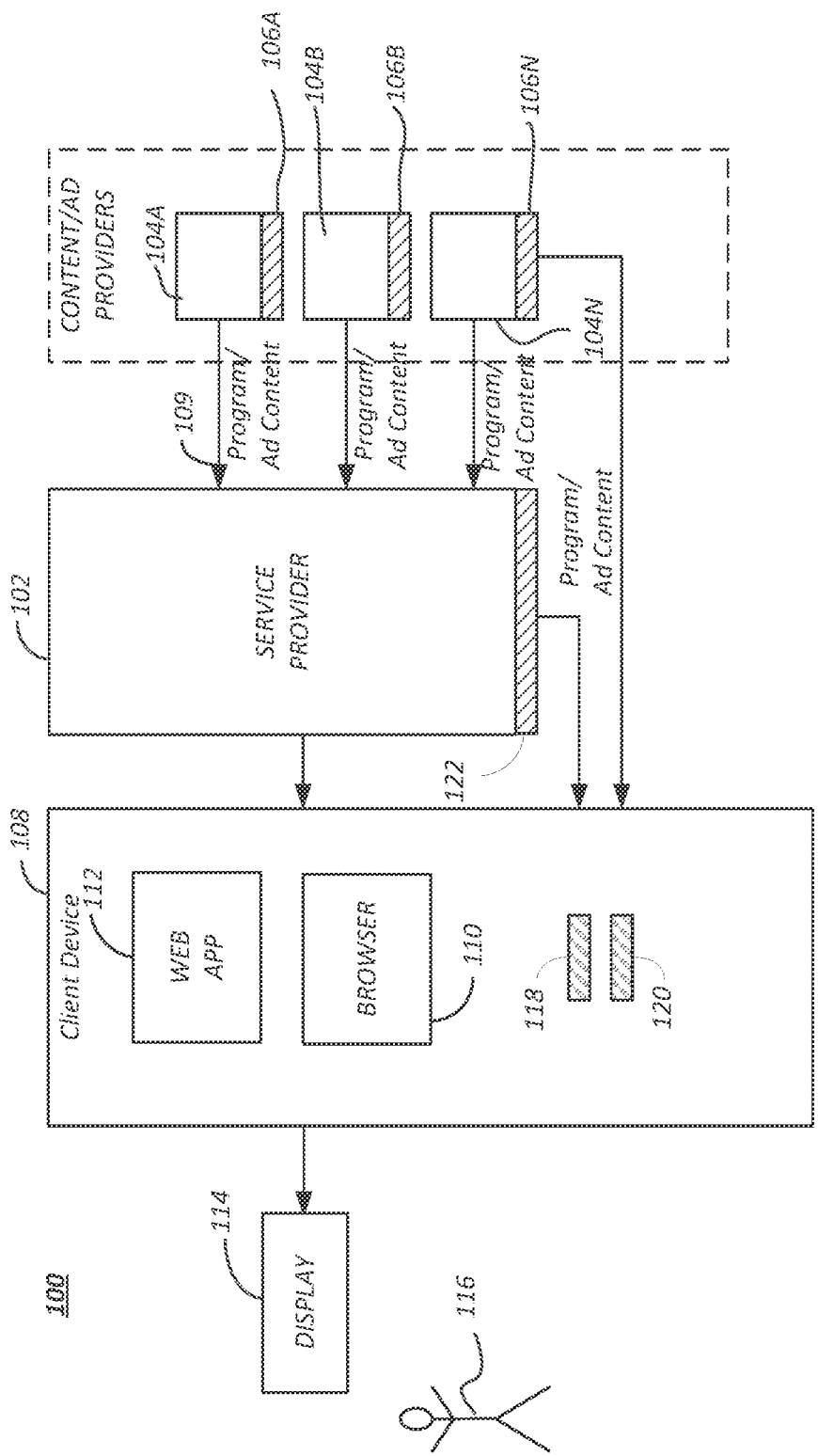
FIG. 1 is a diagram illustrating an exemplary prior art content delivery system.

FIG. 1 is a diagram illustrating an exemplary prior art content delivery system (CDS) 100. The CDS 100 comprises one or more (N) content providers 104A-104N (e.g. FX, HIB), etc., hereinafter alternatively referred to as content provider(s) 104), who each provide one or more media programs for viewing by users 116 by use of one or more client devices 108 in communication with the service provider 102 and/or one or more content providers 104. Typically, the content providers 104 either produce the provided media content, contract with other content providers (such as movie studios and the like) to obtain the rights to copy and distribute such media programs to users 116 for a fee.

In a traditional CDS 100, the content providers 104 provide the content to the users 116 via one or more service providers 102, such as TIME WARNER cable, or DIRECTV, HULU or NETFLIX which aggregate content from a plurality of content providers 104. The service provider 102 contracts with one or more content providers 104, paying fees to those content providers 104 to obtain feeds 109 of the media programs, so that such feeds 109 can be distributed to client devices 108 to present the media content to users 116. The provision of such media programs to users 116 is typically premised on a fee paid to the service provider 102 by the user 116 for such services. The service provider 102 may provide the media programs to users 116 by use of wireless or cable transmission, or by use of service provider applications 118 and 122. Application 122 is executed by the service provider 102 and interfaces with a service provider application 118 executed by the client device 108 to provide requested media content.

When provided over traditional communication channels (wireless or cable), the receiver comprises a set-top-box (STB) or integrated receiver/decoder (IRD), which is an electronic device specifically designed for the purpose of receiving such signals, decrypting and decoding them, and providing the decrypted and decoded signals for presentation on a communicatively coupled or integrated display 114. In such applications, the client device 108 may also comprise a means for recording media programs such as a digital video recorder (DVR). Such DVRs typically permit recording multiple channels at one time and permit the recording of one or more channels of information while concurrently recording information on one or more other channels.

Alternatively or in addition to such delivery of media programs, service providers 102 and content providers 104 may distribute streaming media to the client devices 108 via the Internet, thus bypassing traditional telecommunications systems such as multichannel broadcast television via satellite or cable. Such delivery is known as "over the top" (OTT) and is most synonymous with subscription-based video on demand services.

In OTT embodiments, the client device 108 typically comprises a processing device such as a computer implementing a browser 110 and a web application 112, as well as via an application (applications on mobile devices such as smartphones and tablets, digital media players and smart television platforms.

Delivery can be by means of subscribing to a service provider 102, which accepts contents from multiple content providers 104A-104N and aggregates such content to provide customers with multiple programs from different content providers 104A-104N. Such services are offered by traditional service providers such as DIRECTV (which offers OTT delivery), as well as service providers that provide media programs for OTT delivery only (e.g. HULU and NETFLIX). Such delivery may be accomplished by use of the browser 110 and web application 112, or a special purpose application installed on the client device 108, such as a client-executed service provider application 118 which interfaces with an associated application 122 executed by the service provider 102. Such services are currently provided by HULU, NETFLIX, and others.

Media programs can also be provided directly from the content providers 104, also by OTT delivery). This can be accomplished via the browser 110 and web application 112, or by use of a content provider application 120 installed on the client device 108 which interfaces with an associated application 106 executed by each content provider 104.

Smaller scale television services that offer access to live streams of specialty channels similar to traditional satellite or cable television providers, but streamed over the public Internet rather than a closed private network.

As described above, prior art watermarking schemes are an incomplete, and in some cases ineffective solution to the piracy of digital content.

For example, content producer or service provider and the consumer client devices (e.g. set top boxes) which play the media content are typically sourced from different vendors and are not owned by the same entity. Due to this, client devices cannot detect watermark as detecting such watermarks requires is secret known only to content provider. This prevents the client device from effectively detecting piracy and preventing unauthorized playback. For example, with live IPTV content or YouTube or Netflix content, the content provider might have embedded watermark, but if the content is pirated and played on a client device incapable of detecting the watermark (for example, a SONY PS3 device) this client device cannot detect watermark.

Another problem is that currently, piracy detection via detection of watermarks is typically a manually implemented process, with minimal to zero aspects of the process automated. The primary reason behind this is that the content provider and the client device are from different vendor or business entities and they don't have a common shared secret or other information about watermark that would permit the client device to detect the watermark and report piracy. Further, there is no automated way to notify content producer about the event of piracy and details about it.

Another difficulty is that the process of embedding watermark is currently part of software/firmware running on source or consumer devices. In this disclosure, we describe a cloud-based rules/policy to embed or detect watermark. This permits the management and use of watermarks simultaneously on mass devices without firmware upgrade.

Figure 2A:
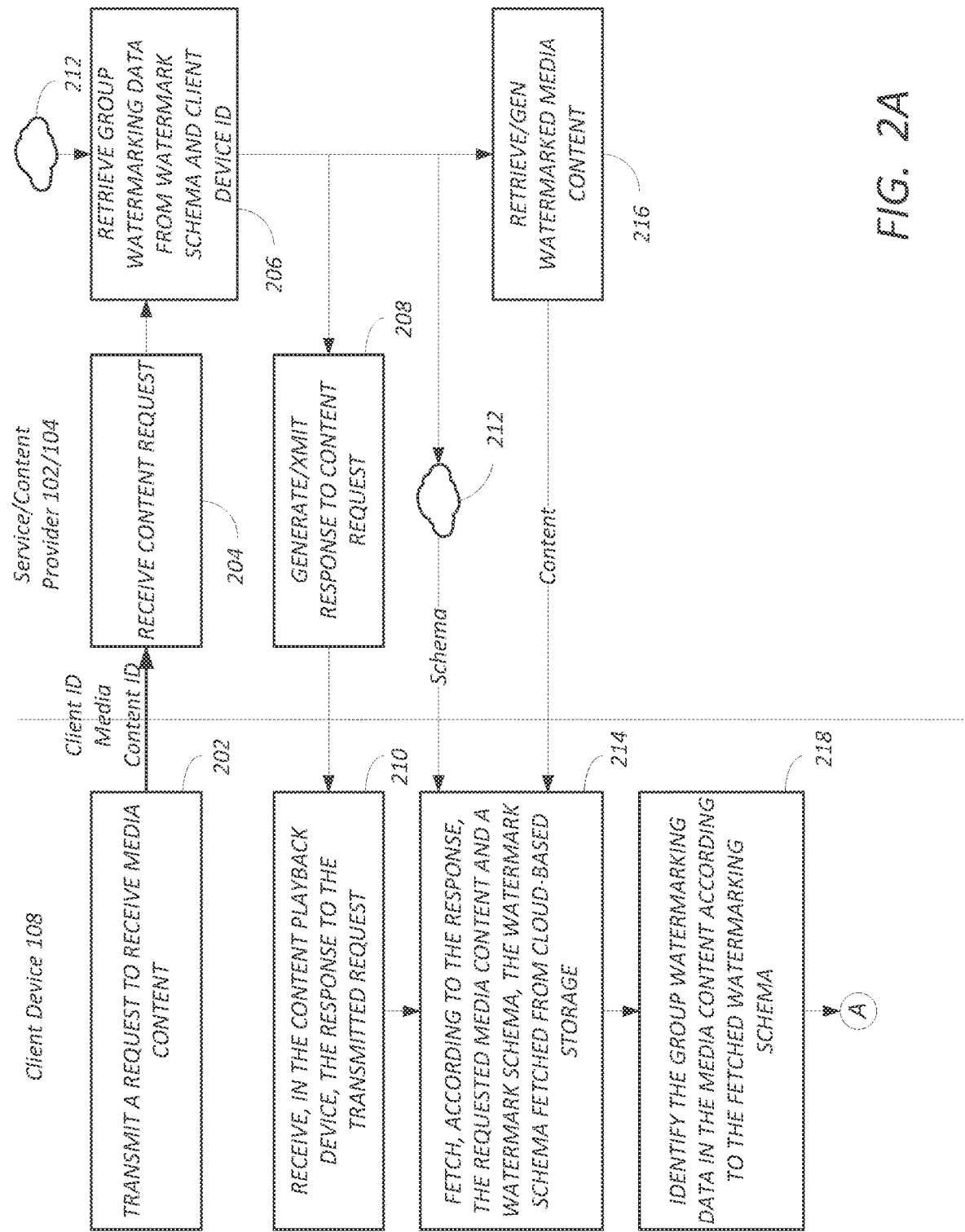
FIGS. 2A-2B are diagrams illustrating one embodiment of a process for managing media content having group watermarking data.
Figure 2B:
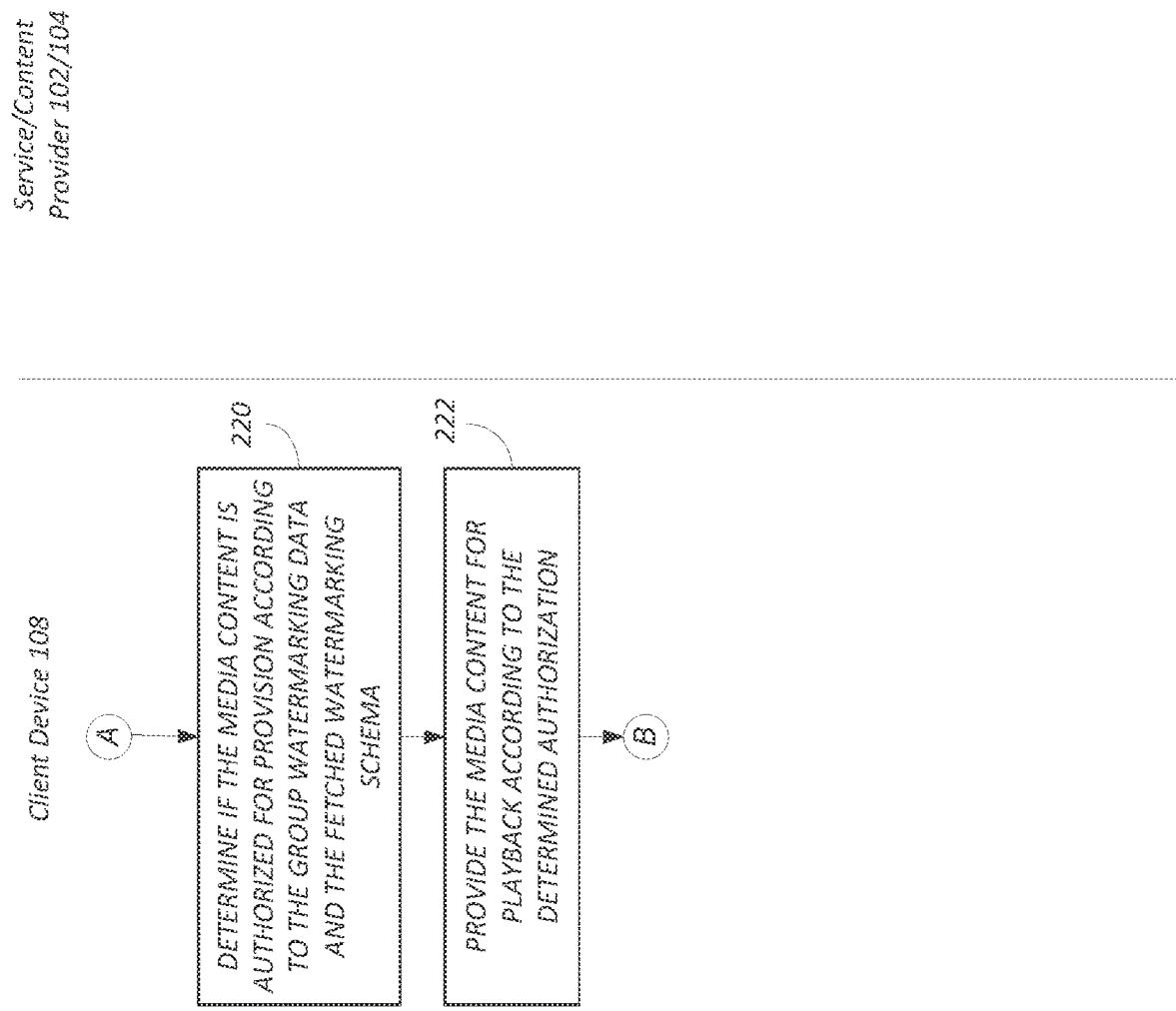

FIGS. 2A-2B are diagrams illustrating one embodiment of a process for managing media content having group watermarking data. In block 202, the client device 102 transmits a request to receive media content. In the illustrated embodiment, the client device 102 transmits the request to either a service provider 102A or content provider 102B. For purposes of simplicity, the operations will be described with respect to a content provider 104, but the operations described hereinafter may be alternately ascribed to the service provider 102. The request includes a client device identifier (client ID), and a media content identifier (media content ID). The client ID may comprise a serial number of the client device 108, or of any element of the client device, such as a system on a chip (SoC), or the IP address of the client device.

In block 204, the content provider 104 receives the content request. In block 206, the content provider retrieves a watermark schema stored in cloud storage 212 shared by the content providers 104 and/or service providers 102 of the group. In block 216, the content provider 104 determines, from the client ID and the media content ID, the appropriate parameter values for the watermark schema parameters, which define how the requested media content is to be watermarked and how that watermarking is to be recovered by the client device 108. This data identifies the client device to receive the media content (the client ID can be used to implement a check to assure that the client device 108 is authorized to receive the media content, and can also be used to select a watermarking technique compatible with the client device 108), and the media content itself (since different media content may have different watermarking requirements).

In block 208, the content provider transmits a response to the client device 108. The response includes information enabling the client device 108 to fetch the portions of the watermarking schema relevant for the selected media content and client device 108. The content provider 104 also generates the watermarked media content by inserting watermark data into the media content according to the parameter values defined in the relevant portions of the watermarking schema, as shown in block 216. In one embodiment, the generated watermark added to the media content includes the client device ID, and when the client device 108 recovers the watermark from the media program, the client device ID recovered from the watermark is compared to the client device ID read from the client device 108, and used to determine if the media content is authorized to be presented. The watermark may include a hashed version of the client ID, and the hashed client device ID recovered from the watermark by the client device 108 compared to a client device 108 generated hash of the client device ID to determine if the media program is authorized for presentation.

Alternatively, in cases where the content provider may simply retrieve a version of the media content that has been appropriately watermarked in advance. In one embodiment, the watermarking data is watermarking data that is common to a combination of a plurality of service providers 102 and/or content providers 104, hereinafter referred to as group watermarking data. The watermarking data may include a group ID, that is recovered by the client device 108 and compared to a group ID that is pre-stored or generated in the client device 108 from the client device ID or other information.

While a particular content producer or provider 104 might have embedded watermark, but the client device 108 may come from different vendors and hence, the client devices 108 do not have a common shared secret needed to identify, extract, and act on the watermark. A common shared digital watermark (i.e. group watermark) as a shared secret among group or alliance of content producer and consumer. The group might comprise of more than one content provider 104 and hence can be uniquely identified by subgroup identifier within a common group watermark. Also, the members of alliance group can still use their private watermarks, so that source content is embedded with both private as well as group watermark.

Table I describes an exemplary embodiment of a watermark schema, including watermarking schema parameters and schema parameter values.

TABLE I

Exemplary Watermarking Schema

| Schema Parameter | Parameter Values (Group Watermarking Data) |
|---|---|
| Use case type/mode | OTT video streaming (e.g. NETFLIX), Video record playback, Cable Live channel |
| Entity that will insert/detect watermark (role of source, repeater, end device) | (Server side embedding watermark? Yes/No) Source (e.g. content provider or service provider): If server side, then embed watermark Repeater (Client device 108): Reinsert watermark in case of content transcoding, overlay local watermark. End device (e.g. IPAD, SONY PS3, cellphone)): Perform watermark detection and/or piracy detection |
| Watermark Technique | Spatial domain Frequency domain Proprietary |

TABLE I-continued

Exemplary Watermarking Schema

| Schema Parameter | Parameter Values (Group Watermarking Data) |
| --- | --- |
| Watermark Type/Details | LSB (Least Significant Bit) Modification based DCT/DWT coefficient based Proprietary information such as: Use VBI/PictureUserData for video/audio streams |
| Embedding location/Format details | Format details like position, payload as text/graphics et is based on technique/type, format details |
| Watermark payload details | Payload size and content details. It also contain sub identifier of content owner like 'VZ' (Verizon), 'YT' (YouTube) as just an examples as part of payload text/graphics etc. |
| Sub details | Like audio/video/graphics/text are separately watermarked. |
| Local Watermark | Local Watermarking data (technique and details |

One watermarking schema parameter is the use case or mode. This selects whether the media content is to be OTT streamed, obtained from media content previously recorded by the client device 108, or from a traditional transmission (wireless, cable transmission), which may include a live broadcast.

Another watermarking schema parameter defines the roles of the source of the media content, the client device 108, and the repeater (e.g. wherein the media content is provided to the client device 108 via another client device 108'), if any. The source of the media content is typically the content provider 104 or the service provider 102, and this entity embeds the watermark. The repeater receives the media content from the source, and retransmits the media content to another device. In cases where the repeater decodes the media content, the repeater may-re-insert the group watermarking data and/or add local watermarking data of its own. The end device can be an STB, IPAD, cellphone or other device, which performs watermark detection, piracy detection, and reports such data to the content provider 104.

Other watermarking schema parameters define the watermarking technique (spatial domain, frequency domain, or a watermarking technique proprietary to a particular content provider 104), and watermark type (LSB modification based watermarking, DCT/DWT coefficient based watermarking, or other proprietary techniques.

The watermarking schema also includes a watermark payload parameter which defines the payload size and content details, as well as a sub identifier that identifies the owner of the content to distinguish their watermark from others in the group. A sub detail watermarking parameter may also be included to allow for separate watermarking of auxiliary information or content provided with the media content.

In block 214, the client device 108 fetches the requested media content and the watermarking schema. The watermark schema is fetched from cloud storage 212, while the watermarked media content is preferably received from a streaming server.

Using the watermarking schema, the client device 108 identifies and recovers the watermark data from the watermarked media program, using the secret shared by the group, as shown in block 218.

Turning to FIG. 2B, the client device 108 then determines if the media content is authorized for provision according to the group watermarking data and the fetched watermarking schema, as shown in block 220, and provides the media content for playback according to the determined authorization, as shown in block 222. Returning to the above example, if the client ID was included in the watermark generated and embedded into the media program, the client device 108 recovers the watermark and compares the client ID recovered from the watermark with the client ID of the client device (for example, read from secure memory).

To assure that the client device 108 recovers and processes the watermark to determine if playback is authorized, the watermark may include data that is required to decrypt and present the media program. In this instance, if the watermark data is not recovered, the media content cannot be decrypted. Alternatively or in addition to this, watermark recovery operations can be integrated with other required processing operations, and such operations can be performed in a secure (or trusted) processor environment to assure that the watermark recovery process is performed and not tampered with.

Figure 3:
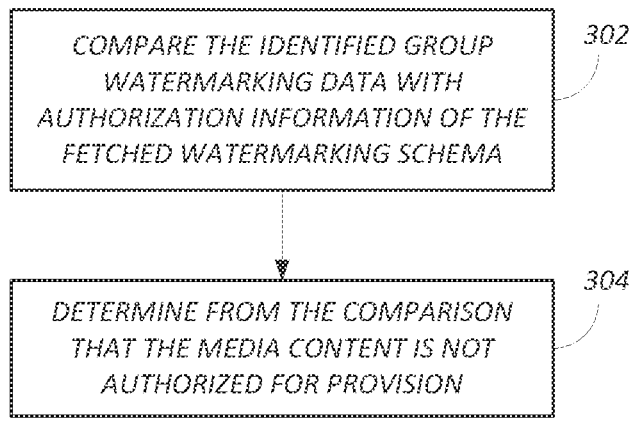
FIG. 3 is a diagram illustrating exemplary operations to determine if the media content is authorized for provision according to the recovered group watermarking data and the fetched watermarking schema.

FIG. 3 is a diagram illustrating exemplary operations to determine if the media content is authorized for provision according to the recovered group watermarking data and the fetched watermarking schema. In block 302, the recovered and identified group watermarking data is compared with authorization information of the fetched watermarking schema. That comparison is used to determine whether the media content is authorized for provision or not authorized for provision, as shown in block 304. In this example, the client device 108 compares the extracted watermarking data with parameters in the watermark schema, and determines whether to provide the media content for playback based upon this comparison. For example, this can be implemented by applying a cryptographic operation (e.g. decryption or hash operation) on portions of the recovered watermark and comparing the result to data obtained from the watermark schema.

Figure 4:
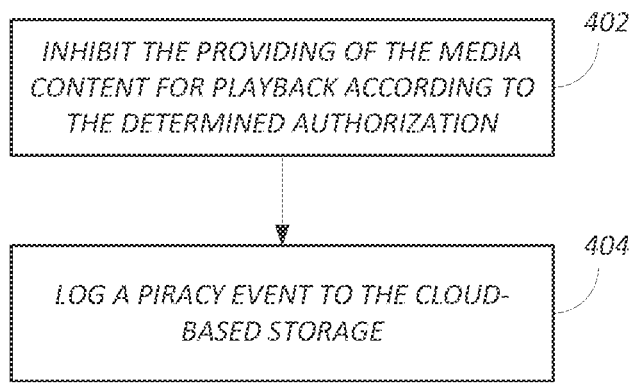
FIG. 4 is a diagram illustrating exemplary operations executed if the media program is determined to be not authorized for provision.

FIG. 4 is a diagram illustrating exemplary operations executed if the media program is determined to be not authorized for provision. In block 402, the provision of the media content is inhibited according to the determined authorization. In block 404, a piracy event is logged to the cloud based storage 212, where it can be retrieved by the content provider 104 that initially provided the media program to the client device or any other member of the group.

In one embodiment, the logged privacy event includes one or more of: (1) the identity of the device that provided the media content to the client device 108 for presentation (if not the content provider 104), (2) the identity of the client device 108 that detected the piracy and details about the device and detection (e.g. device serial number, IP address, user ID, location, detection time and date, SoC serial number), (3) video content details (e.g. media content identifier, clock time into the media content where piracy was detected, resolution and frame rate of media program), and (4) an identifier of the watermark subgroup (if any).

Once the media content has been provided to the client device 108, the client device 108 may attempt (authorized or not) to transmit the watermarked media content to a second client device 108' for playback.

Figure 5A:
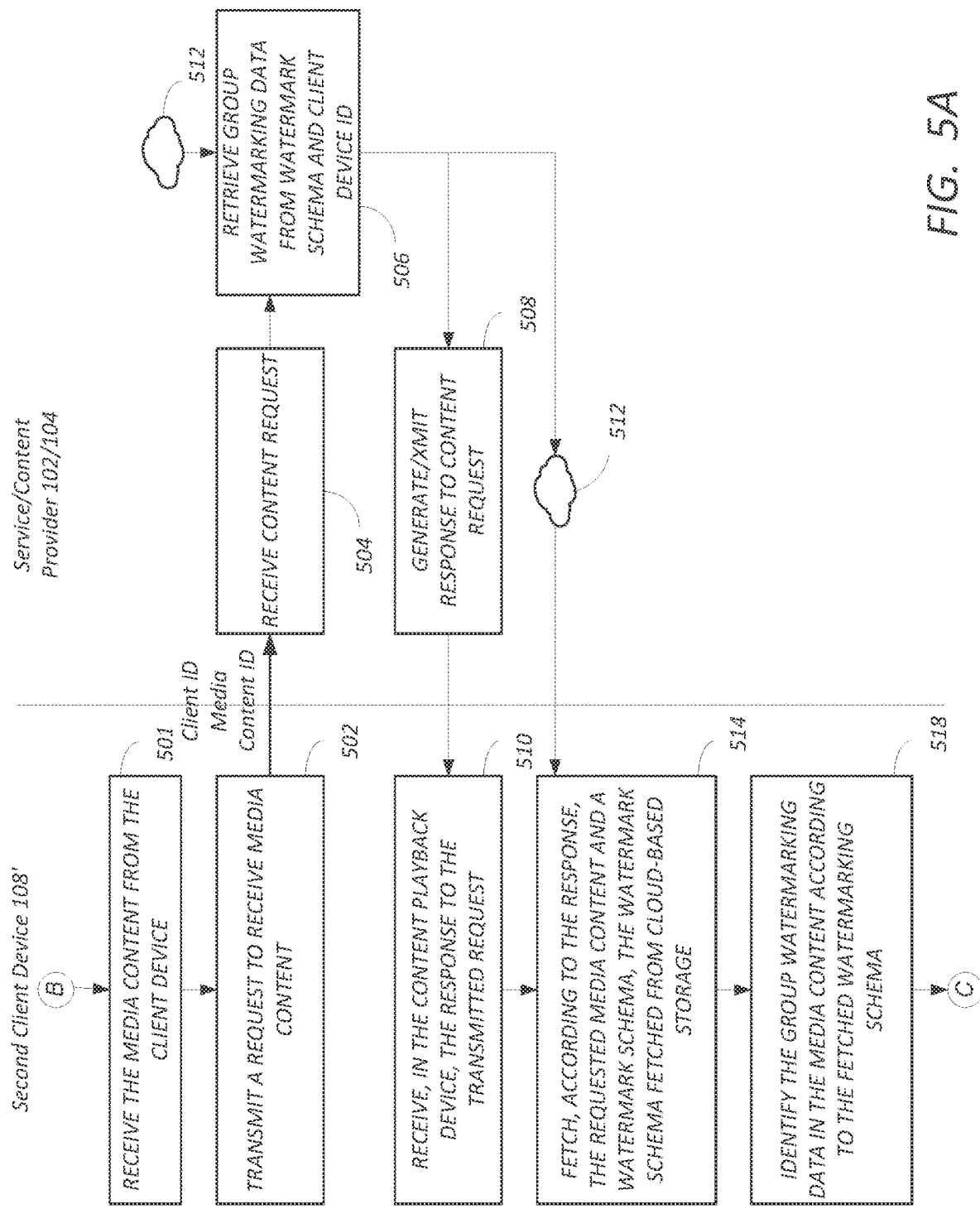

FIGS. 5A and 5B are diagrams illustrating the application of the watermark procedure to a second client device 108' that receives watermarked media content from the client device 108. The client device 108 transmits the watermarked media content to the second client device 108', where it is received, as shown in block 501. The remaining operations mirror those that were performed by the client device 108, except there is no need for the service provider 102 or content provider 104 to watermark the content (it is already watermarked), nor to transmit the watermarked content to the second client device 108' (it is received from the client device 108). Hence, the operations of blocks 202-222 being performed as illustrated in 502-514 and 516-522 by the second client device 108'.

As described above with respect to FIGS. 3 and 4, whether to provide the media content is determined by comparison of the group watermarking data and the fetched watermarking schema, and if it is determined that the provision of the media content is not authorized, the provision of the media content is inhibited, and a piracy event is logged to the cloud based storage 212.

Figure 6:
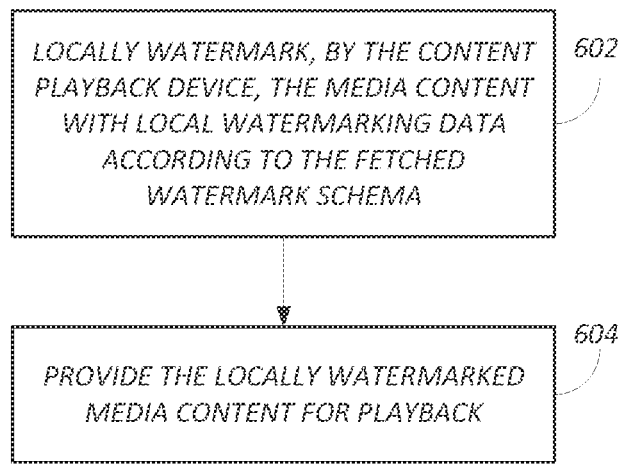
FIG. 6 is a diagram illustrating local watermarking of the media content.

As shown FIG. 6, the client device 108 can also locally watermark the media program before transmitting the media program to the second client device 108'. In block 602, the client device 108 locally watermarks the media content with local watermarking data according to the fetched watermarking schema. In block 604, the locally watermarked data is provided (to the second client device 108') for playback.

Figure 7:
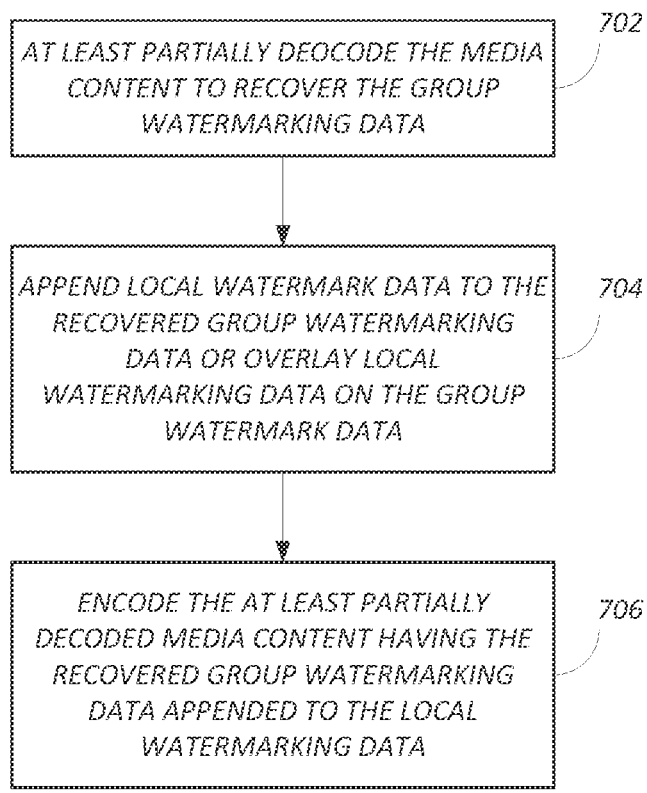
FIG. 7 is a diagram illustrating an exemplary embodiment of how the media program can be locally watermarked.

FIG. 7 is a diagram illustrating an exemplary embodiment of how the media program can be locally watermarked. In this embodiment, the local media program is at least partially decoded to recover the group watermarking data applied by the content provider 104, as shown in block 702. Local watermarking data (obtained from the watermark schema fetched by the client device 108 is added to group watermarking data, as shown in block 704. This can be accomplished by appending the local watermarking data to the group watermarking data (e.g. if the recovered group watermarking data is a number, the local watermarking data can simply be appended to the recovered group watermarking data), or overlaid on the group watermarking data (e.g. if the group watermarking data is a number, and the local watermarking data is a second number, a third number that is a function of the group watermarking data and the local watermarking data may be inserted, so that the local watermarking data can be determined if the group watermarking data is known). The local watermarking data can also be added to the media content in a way that does not change or interfere with the group watermarking data (e.g. if the group watermarking data is inserted in odd frames or in a corner of each frame, the local watermarking data may be inserted into even frames or a different corner of each frame. The at least partially decoded media content is then re-encoded, as shown in block 706. The result is that the media content now includes two watermarks: (1) the group watermark inserted by the content provider 104, and (2) local watermarking data inserted by the client device 108.

Figure 8A:
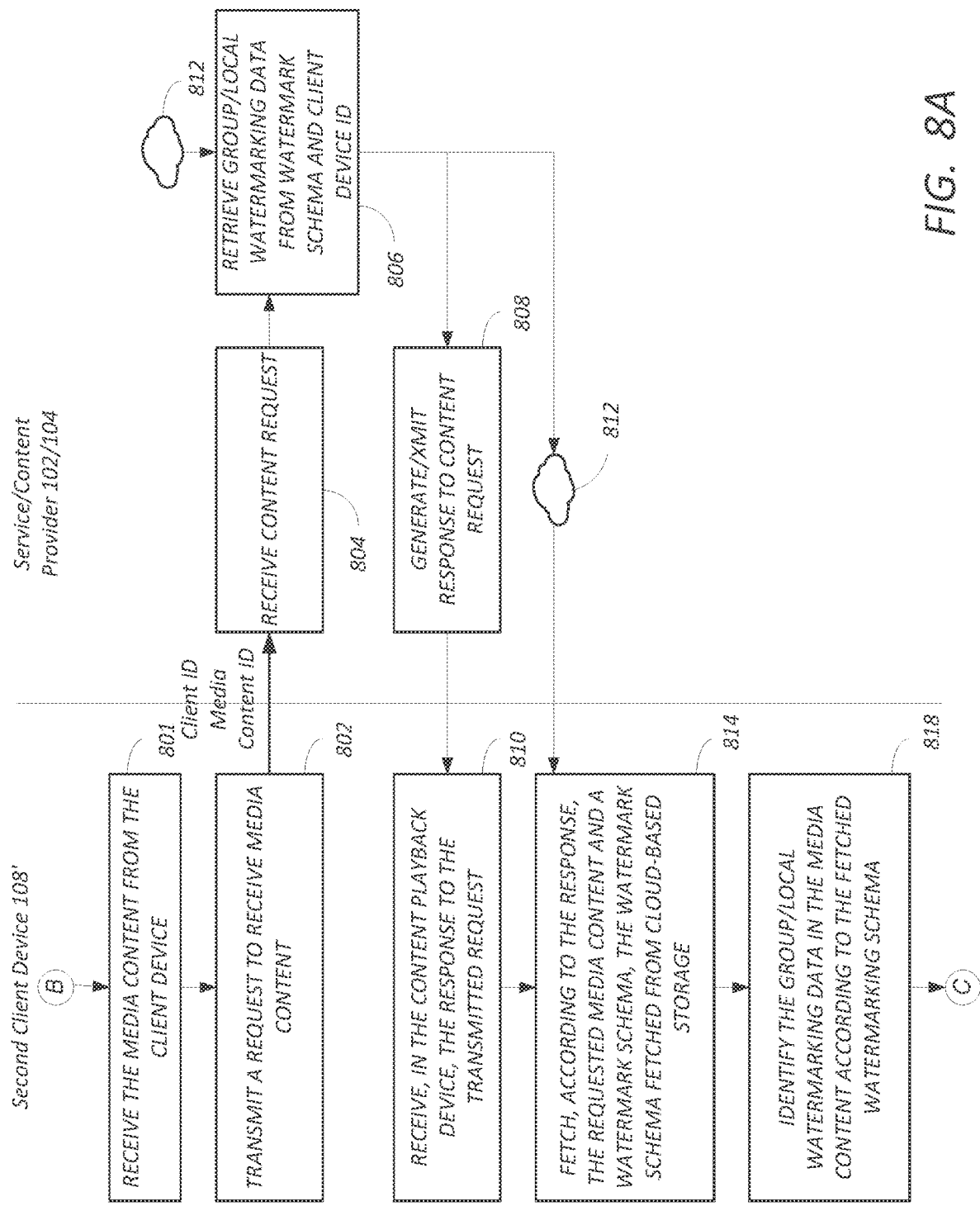

FIGS. 8A and 8B are diagrams illustrating the application of the watermark procedure to a second client device 108' that receives locally watermarked media content from the client device 108. In block 801, the locally watermarked (and optionally group watermarked) media content is received in the second client device 108'. The remaining operations mirror those that were performed by the client device 108, except there is no need for the service provider 102 or content provider 104 to watermark the content (it is already group watermarked by the service provider 102 or contact provider 104 and/or locally watermarked by the client device 108), nor to transmit the watermarked content to the second client device 108' (it is received from the client device 108). Hence, the operations of blocks 202-214 being performed as illustrated in 802-814 by the second client device 108'. In block 818, the second client device identifies and recovers the local watermarking data (and group watermarking data, if present) and compares the recovered data to the fetched watermarking schema. Turning to FIG. 8B, the second client device 108' determines if the media content is authorized for provision according to the local watermarking data and the fetched watermarking schema, and provides the media content for playback according to the determined authorization, as shown in blocks 820 and 822. In one embodiment, this authorization is also based on the group watermarking data.

As described above with respect to FIGS. 3 and 4, whether to provide the media content is determined by comparison of the local (and optionally, the group) watermarking data and the fetched watermarking schema, and if it is determined that the provision of the media content is not authorized, the provision of the media content is inhibited, and a piracy event is logged to the cloud based storage 212. In this example, the logged piracy event may comprise one or more of an identifier of the client device, an identifier of the media content, an identifier of the group associated with the group watermarking data, an identifier of the client device 108 that provided the media content, and an identifier of the local watermarking data.

Hardware Environment

Figure 9:
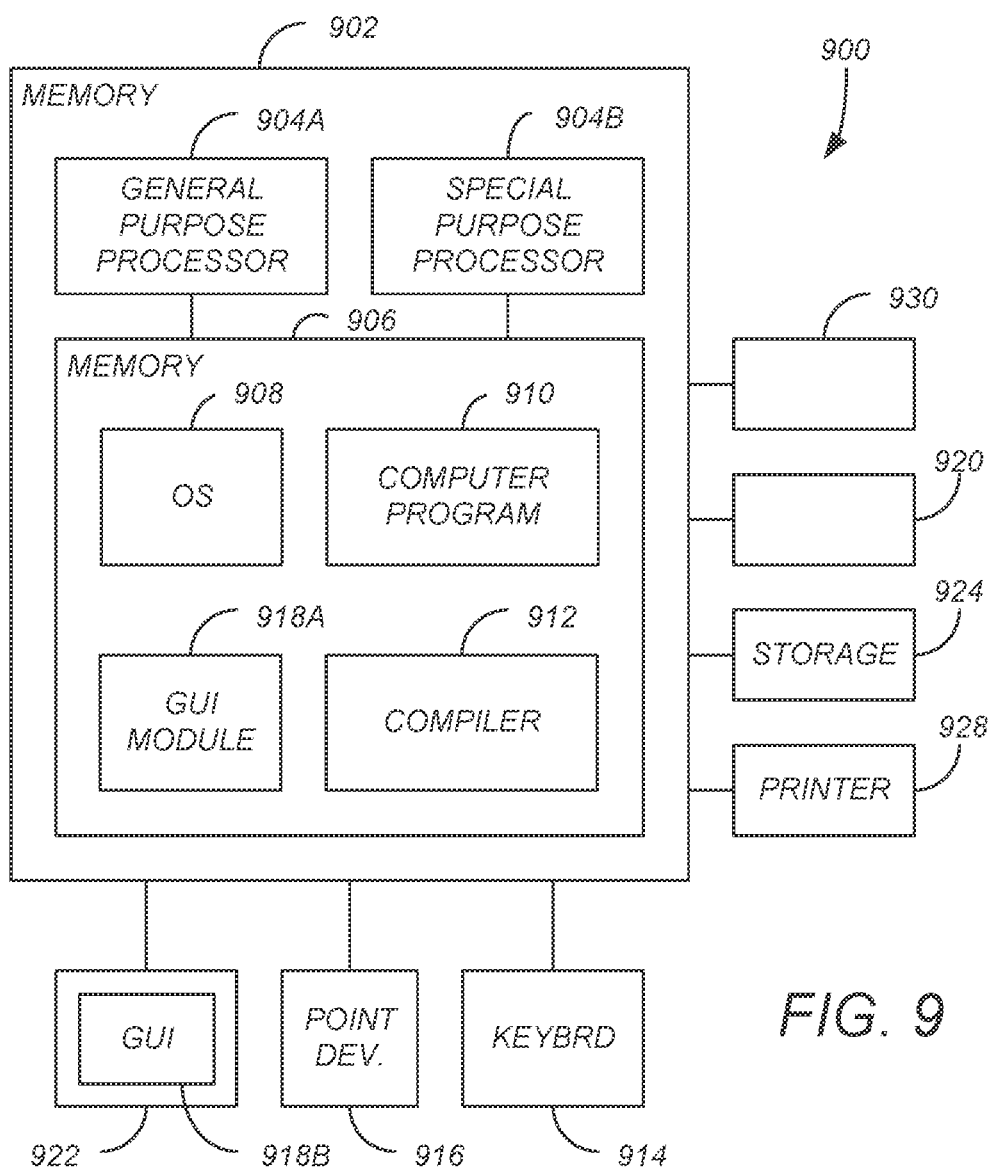
FIG. 9 is a diagram illustrating an exemplary computer system 900 that could be used to implement elements of the system

FIG. 9 is a diagram illustrating an exemplary computer system 900 that could be used to implement elements of the system, including the client device 108, elements of the service provider(s) 102, the content provider(s), and the display 114. The computer 902 comprises a general purpose hardware processor 904A and/or a special purpose hardware processor 904B (hereinafter alternatively collectively referred to as processor 904) and a memory 906, such as random access memory (RAM). The computer 902 may be coupled to other devices, including input/output (I/O) devices such as a keyboard 914, a mouse device 916 and a printer 928.

In one embodiment, the computer 902 operates by the general purpose processor 904A performing instructions defined by the computer program 910 under control of an operating system 908. The computer program 910 and/or the operating system 908 may be stored in the memory 906 and may interface with the user and/or other devices to accept input and commands and, based on such input and commands and the instructions defined by the computer program 910 and operating system 908 to provide output and results.

Output/results may be presented on the display 922 or provided to another device for presentation or further processing or action. In one embodiment, the display 922 comprises a liquid crystal display (LCD) having a plurality of separately addressable pixels formed by liquid crystals. Each pixel of the display 922 changes to an opaque or translucent state to form a part of the image on the display in response to the data or information generated by the processor 904 from the application of the instructions of the computer program 910 and/or operating system 908 to the input and commands. Other display 922 types also include picture elements that change state in order to create the image presented on the display 922. The image may be provided through a graphical user interface (GUI) module 918A. Although the GUI module 918A is depicted as a separate module, the instructions performing the GUI functions can be resident or distributed in the operating system 908, the computer program 910, or implemented with special purpose memory and processors.

Some or all of the operations performed by the computer 902 according to the computer program 910 instructions may be implemented in a special purpose processor 904B. In this embodiment, some or all of the computer program 910 instructions may be implemented via firmware instructions stored in a read only memory (ROM), a programmable read only memory (PROM) or flash memory within the special purpose processor 904B or in memory 906. The special purpose processor 904B may also be hardwired through circuit design to perform some or all of the operations to implement the present invention. Further, the special purpose processor 904B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 902 may also implement a compiler 912 which allows an application program 910 written in a programming language such as COBOL, C++, FORTRAN, or other language to be translated into processor 904 readable code. After completion, the application or computer program 910 accesses and manipulates data accepted from I/O devices and stored in the memory 906 of the computer 902 using the relationships and logic that was generated using the compiler 912.

The computer 902 also optionally comprises an external communication device such as a modem, satellite link, Ethernet card, or other device for accepting input from and providing output to other computers.

In one embodiment, instructions implementing the operating system 908, the computer program 910, and/or the compiler 912 are tangibly embodied in a computer-readable medium, e.g., data storage device 920, which could include one or more fixed or removable data storage devices, such as a zip drive, floppy disc drive 924, hard drive, CD-ROM drive, tape drive, or a flash drive. Further, the operating system 908 and the computer program 910 are comprised of computer program instructions which, when accessed, read and executed by the computer 902, causes the computer 902 to perform the steps necessary to implement and/or use the present invention or to load the program of instructions into a memory, thus creating a special purpose data structure causing the computer to operate as a specially programmed computer executing the method steps described herein. Computer program 910 and/or operating instructions may also be tangibly embodied in memory 906 and/or data communications devices 930, thereby making a computer program product or article of manufacture according to the invention. As such, the terms "article of manufacture," "program storage device" and "computer program produce" or "computer readable storage device" as used herein are intended to encompass a computer program accessible from any computer readable device or media.

Of course, those skilled in the art will recognize that any combination of the above components, or any number of different components, peripherals, and other devices, may be used with the computer 902.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

The foregoing discloses an apparatus, method and system for managing media content having group watermarking data, including: transmitting a request to receive the media content from a content playback device; receiving a response to the transmitted request; fetching, by the content playback device according to the response, the requested media content and a watermark schema, the watermark schema fetched from cloud-based storage; identifying, by the content playback device, the group watermarking data in the media content according to the fetched watermarking schema; determining, by the content playback device if the media content is authorized for provision according to the group watermarking data and the fetched watermarking schema; and providing the media content for playback according to the determined authorization.

Implementations May Include One or More of the Following Features:

Any of the methods described above, wherein the method further includes; receiving the request to receive the media content from the content playback device; fetching, by a content provider, the requested media content and the watermark schema, the watermark schema fetched from cloud-based storage; and watermarking the requested media content with the group watermarking data according to the fetched watermark schema.

Any of the methods described above, wherein providing the media content for playback according to the determined authorization includes: providing the media content for playback by the content playback device.

Any of the methods described above, wherein determining, by the content playback device if the media content is authorized for provision according to the group watermarking data and the fetched watermarking schema includes: determining, by the content playback device, that the media content is not authorized for provision according to the group watermarking data and the fetched watermarking schema; comparing the identified group watermarking data with authorization information of the fetched watermarking schema; determining, from the comparison, that the media content is not authorized for provision; providing the media content for playback according to the determined authorization includes: inhibiting the providing of the media content for playback according to the determined authorization; and logging a piracy event to the cloud-based storage.

Any of the above methods, wherein the piracy event includes: an identifier of the content playback device; an identifier of the media content; and an identifier of a group associated with the group watermarking data.

Any of the above methods, wherein providing the media content for playback according to the determined authorization includes: transmitting the media content to a second content playback device for playback by the second content playback device.

Any of the above methods, further including: fetching, by a second content playback device, the group watermarked media content and the watermark schema from cloud-based storage; identifying the group watermarking data in the media content according to the fetched watermarking schema; determining if the media content is authorized for provision according to the group watermarking data and the fetched watermarking schema; and providing the media content for playback according to the determined authorization.

Any of the methods described above, wherein providing the media content for playback according to the determined authorization includes: locally watermarking, by the content playback device, the media content with local watermarking data according to the fetched watermark schema; and providing the locally watermarked media content for playback.

Any of the methods described above, wherein locally watermarking, by the content playback device, the media content with local watermarking data according to the fetched watermark schema includes: at least partially decoding the media content to recover the group watermarking data; performing at least one of: appending local watermarking data to the recovered group watermarking data; overlaying the local watermarking data to the group watermarking data. The method may also include encoding the at least partially decode media content having the recovered group watermarking data appended to the local watermark data. The method wherein providing the locally watermarked media content for playback includes providing the media content for playback by the second content playback device.

Any of the methods described above, wherein providing the locally watermarked media content for playback by the second content playback device including: transmitting the locally watermarked media content for playback by the second content playback device; receiving, in the second content playback device, the locally watermarked media content from the content playback device and the watermark schema from the cloud-based storage; identifying the locally watermarked data in the locally watermarked media content according to the fetched watermarking schema; and determining if the locally watermarked media content is further authorized for provision according to the local watermarking data and the fetched watermarking schema; and providing the locally watermarked media content for playback according to the determined further authorization.

Any of the methods described above, wherein the provision of the locally watermarked media content is further authorized based on the group watermarking data.

Any of the methods described above, wherein determining, by the second content playback device, if the media content is authorized for provision according to the group watermarking data and the fetched watermarking schema includes: determining, by the second content playback device, that the media content is not authorized for provision according to the group watermarking data, the locally watermarked data, and the fetched watermarking schema, including: comparing the identified group watermarking data with authorization information of the fetched watermarking schema; determining, from the comparison, that the media content is not authorized for provision; providing the media content for playback according to the determined authorization includes: inhibiting, by the second content playback device, the providing of the media content for playback according to the determination; and logging a piracy event to the cloud-based storage.

Any of the above methods, wherein the piracy event includes: an identifier of the content playback device; an identifier of the media content; an identifier of a group associated with the group watermarking data; an identifier of the locally watermarked data; and an identifier of the content playback device.

Another embodiment is evidenced by a an apparatus for managing media content having group watermarking data, including: a processor; a memory, communicatively coupled to the processor, the memory storing processor instructions including processor instructions for performing the method steps described above.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of managing media content having group watermarking data, comprising:
    transmitting a request to receive the media content from a content playback device;
    receiving a response to the transmitted request;
    fetching, by the content playback device according to the response, the requested media content from a service provider, the requested media content having group watermarking data the group watermarking data being a shared secret among one or more content producers and one or more consumers;
    fetching, by the content playback device according to the response, a watermark schema, the watermark schema fetched from cloud-based storage;
    identifying, by the content playback device, the group watermarking data in the redia content;
    comparing, by the content playback device, the group watermarking data of the requested media content to the fetched watermark schema;
    in response to the group watermarking data matching the fetched watermark schema, determining, by the content playback device, the media content is authorized for provision; and
    providing the media content for playback according to the determined authorization.

2. The method of claim 1, further comprising:
    receiving the request to receive the media content from the content playback device;
    fetching, by a content provider, the requested media content and the watermark schema, the watermark schema fetched from the cloud-based storage; and
    watermarking the requested media content with the group watermarking data according to the fetched watermark schema.

3. The method of claim 1, wherein providing the media content for playback according to the determined authorization comprises:
    providing the media content for playback by the content playback device.

4. The method of claim 1, comprising:
    in response to the group watermarking data not matching the fetched watermark schema, determining, by the content playback device, that the media content is not authorized for provision; and
    wherein the providing the media content for playback according to the determined authorization comprises:
        inhibiting the providing of the media content for playback according to the determined authorization; and
        logging a piracy event to the cloud-based storage.

5. The method of claim 4, wherein the piracy event comprises:
    an identifier of the content playback device;
    an identifier of the media content; and
    an identifier of a group associated with the group watermarking data.

6. The method of claim 1, wherein providing the media content for playback according to the determined authorization comprises:

transmitting the media content to a second content playback device for playback by the second content playback device.

7. The method of claim 6, further comprising:
fetching, by a second content playback device, the group watermarked media content;
fetching, by the second content playback device, the watermark schema from cloud-based storage;
identifying, by the second content playback device, the group watermarking data in the media content:
comparing, by the second content playback device, the group watermarking data of the media content to the fetched watermark schema;
in response to the group watermarking data matching the fetched watermark schema, determining the media content is authorized for provision; and
providing the media content for playback according to the determined authorization.

8. The method of claim 7, wherein providing the media. content for playback according to the determined authorization comprises:
locally watermarking, by the content playback device, the media content with local watermarking data according to the fetched watermark schema.

9. The method of claim 8, wherein:
locally watermarking, by the content playback device, the media content with local watermarking data according to the fetched watermark schema comprises:
at least partially decoding the media content to recover the group watermarking data;
performing at least one of:
appending local watermarking data to the recovered group watermarking data; overlaying the local watermarking data to the group watermarking data; and
encoding the at least partially decode media content having the recovered group watermarking data appended to the local watermark data.

10. The method of claim 9, wherein providing the locally watermarked media content for playback comprises providing the media content for playback by the second content playback device.

11. The method of claim 10, wherein:
providing the locally watermarked media content for playback by the second content playback device comprising:
transmitting the locally watermarked media content for playback by the second content playback device;
receiving, in the second content playback device, the locally watermarked media content from the content playback device and the watermark schema from the cloud-based storage;
identifying the locally watermarked data in the locally watermarked media content according to the fetched watermarking schema; and
determining if the locally watermarked media content is further authorized for provision according to the local watermarking data and the fetched watermarking schema; and
providing the locally watermarked media content for playback according to the determined further authorization.

12. The method of claim 11, wherein:
the provision of the locally watermarked media content is further authorized based on the group watermarking data.

13. The method of claim 8, comprising:
in response to the group watermarking data not matching the fetched watermark schema, determining, by the second content playback device, the media content is not authorized for provision; and
wherein the providing the media content for playback comprises:
inhibiting, by the second content playback device, the providing of the media content for playback according to the determination; and
ogging a piracy event to the cloud-based storage.

14. The method of claim 13, wherein the piracy event comprises:
an identifier of the content playback device;
an identifier of the media content;
an identifier of a group associated with the group watermarking data;
an identifier of the locally watermarked data; and
an identifier of the content playback device.

15. An apparatus for managing media content having group watermarking data, comprising: a processor;
a memory, communicatively coupled to the processor, the memory storing processor instructions comprising processor instructions for:
transmitting a request to receive the media content from a content playback device;
receiving a response to the transmitted request;
fetching, by the content playback device according to the response, the requested media content from a service provider, the requested media content having group watermarking data watermarking data, the group watermarking data being a shared secret among one or more content producers and one or more consumers;
fetching, by the content playback device according to the response, a watermark schema, the watermark schema fetched from cloud-based storage;
identifying, by the content playback device, the group watermarking data in the media content;
comparing, by the content playback device, the group watermarking data of the requested media content to the fetched watermark schema;
in response to the group watermarking data matching the fetched watermark schema, determining, by the content playback device, the media content is authorized for provision; and
providing the media content for playback according to the determined authorization.

16. The apparatus of claim 15, further comprising:
a second processor;
a second memory, communicatively coupled to the second processor, the second memory storing second processor instructions comprising second processor instructions for:
receiving the request to receive the media content from the content playback device;
fetching, by a content provider, the requested media content and the watermark schema, the watermark schema fetched from the cloud-based storage; and
watermarking the requested media content with the group watermarking data according to the fetched watermark schema.

17. The apparatus of claim 15, comprising processor instructions for:
in response to the group watermarking data not matching the fetched watermark schema, determining, by the content playback device, that the media content is not authorized for provision; and wherein the processor instructions for providing the media content for playback according to the determined authorization comprise processor instructions for:
inhibiting the providing of the media content for playback according to the determined authorization; and
logging a piracy event to the cloud-based storage.

18. The apparatus of claim 17, wherein the piracy event comprises: an identifier of the content playback device;
an identifier of the media content; and
an identifier of a group associated with the group watermarking data.

19. The apparatus of claim 15, wherein, the processor instructions for providing the media content for playback according to the determined authorization comprise processor instructions for:
transmitting the media content to a second content playback device for playback by the second content playback device; the apparatus further comprising processor instructions for:
fetching, by a second content playback device, the group watermarked media content;
fetching, by the second content playback device, the watermark schema from cloud-based storage;
identifying, by the second content playback device, the group watermarking data in the media content;
comparing, by the second content playback device, the group watermarking data of the media content to the fetched watermark schema;
in response to the group watermarking data matching the fetched watermark schema, determining the media content is authorized for provision; and
providing the media content for playback according to the determined authorization.

20. An apparatus for managing media content having group watermarking data, comprising:
means for transmitting a request to receive the media content from a content playback device;
means for receiving a response to the transmitted request;
means for fetching, by the content playback device according to the response; the requested media content from a service provider, the requested media content having group watermarking data watermarking data, the group watermarking data being a shared secret among one or more content producers and one or more consumers;
means for fetching, by the content playback device according to the response, a watermark schema, the watermark schema fetched from cloud-based storage;
means for identifying, by the content playback device, the group watermarking data in the media content;
means for comparing, by the content playback device, the group watermarking data of the requested media content to the fetched watermark schema;
in response to the group watermarking data matching the fetched watermark schema, means for determining, by the content playback device, the media content is authorized for provision; and
means for providing the media content for playback according to the determined authorization.

* * * * *